United States Patent
Bättig et al.

[11] Patent Number: 5,450,231
[45] Date of Patent: Sep. 12, 1995

[54] MODULATOR FOR A LIGHT BEAM

[75] Inventors: Rainer Bättig, Berne; Paul Vogel, Steffisburg, both of Switzerland

[73] Assignee: Ascom Tech Ltd., Berne, Switzerland

[21] Appl. No.: 153,983

[22] Filed: Nov. 18, 1993

[30] Foreign Application Priority Data

Nov. 20, 1992 [CH] Switzerland .............. 03567/92

[51] Int. Cl.6 ............................................ G02F 1/19
[52] U.S. Cl. ................................ 359/290; 359/291
[58] Field of Search ...................... 359/290, 291, 292

[56] References Cited

U.S. PATENT DOCUMENTS

| | | | |
|---|---|---|---|
| 2,896,507 | 7/1959 | Mast et al. | 359/290 |
| 4,289,379 | 9/1981 | Michelet | 359/290 |
| 4,298,247 | 11/1981 | Michelet et al. | 359/290 |
| 4,675,500 | 6/1987 | Kunz et al. | 350/359 |
| 5,159,498 | 10/1992 | Hubbard, Jr. | 359/847 |

FOREIGN PATENT DOCUMENTS

| | | |
|---|---|---|
| 0420468A2 | 4/1991 | European Pat. Off. |
| 403197A1 | 4/1992 | Germany. |

*Primary Examiner*—Mark Hellner
*Attorney, Agent, or Firm*—Burns, Doane, Swecker & Mathis

[57] ABSTRACT

A light modulator for modulating a light beam which emerges in the shape of a cone from an optical fiber. The modulator has a mirror which can be brought into at least two different states. In the one of these states, the light diverges in such a way that only a small portion returns back into the fiber. In the other of these states, however, more of the light returns back into the fiber. In one embodiment, the mirror is embodied as an etched semiconductor foil and is deformed by the force of a variable electrostatic field between the foil and an electrode which has been placed on a substrate.

12 Claims, 2 Drawing Sheets

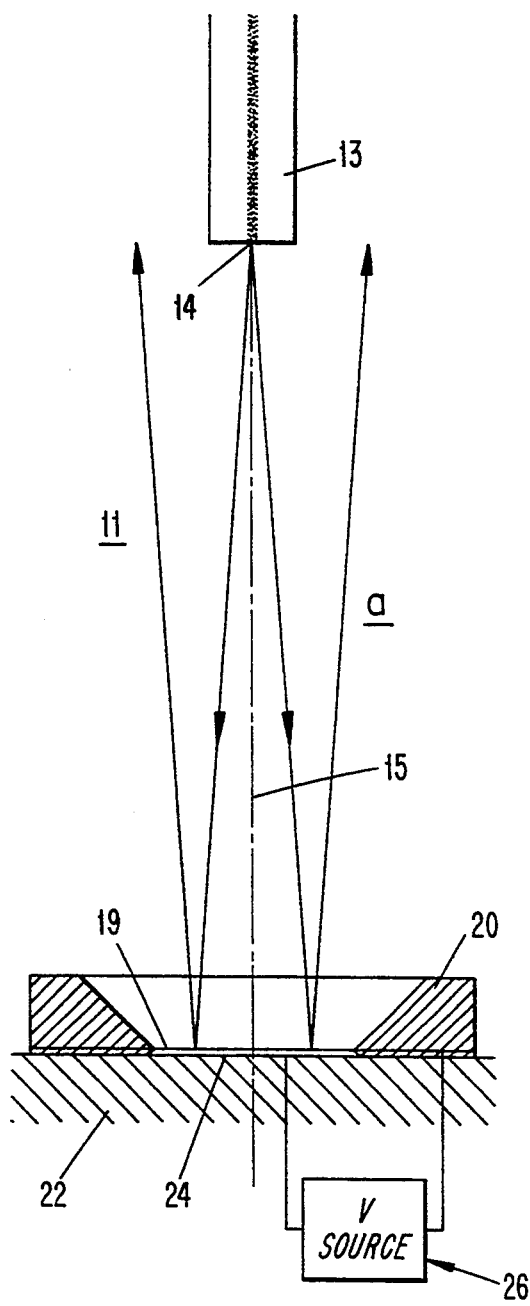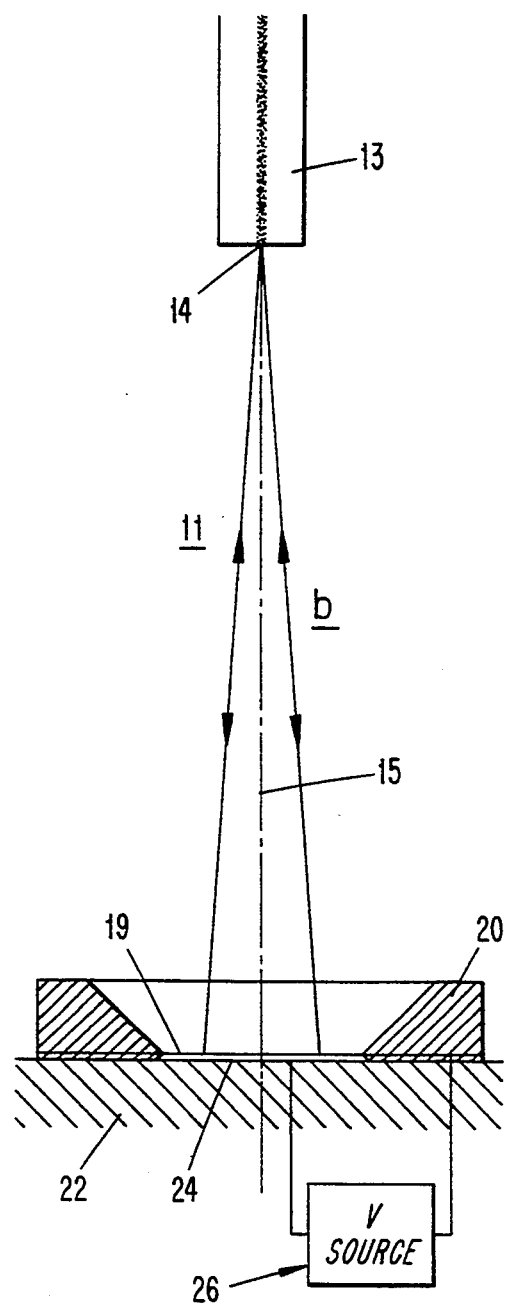

MODULATOR FOR A LIGHT BEAM

FIELD OF THE INVENTION

This invention relates to a light modulator for modulating the intensity of a light beam emerging from an optical fiber, and, more particularly, to a light modulator having a mirror disposed in the optical axis, which reflects the light beam back onto itself.

BACKGROUND OF THE INVENTION

An optical reflection modulator is known from German Patent Publication DE 40 31 970. Here, the light emerging from the blunt end of an optical fiber strikes a mirror disposed orthogonally to the fiber. This mirror back-reflects the light back onto itself, creating a standing wave in the manner of a Fabry-Perot resonator between the reflecting fiber end and the mirror, provided their distance from each other corresponds to a multiple of half a wavelength of the light used. By changing this distance, particularly by displacing the mirror, the Fabry-Perot resonator can be detuned and the intensity of the light can be changed.

The described modulator is of a relatively simple design and has good modulating properties. However, it is dependent on the absolute value of the distance between the fiber end and the mirror, which changes because of many effects, for example, as a function of the temperature. It is therefore necessary in such arrangements to provide a regulator which maintains the effective path length or "optical distance" between the fiber end and the mirror constant.

OBJECT AND SUMMARY OF THE INVENTION

Based on this state of the art, it is an object of the present invention to provide a light modulator having modulating properties which are comparable to those of prior devices but which does not require maintaining a length constant.

The present invention is distinguished by great simplicity and operates in a highly sensitive manner. Thus it constitutes an excellent modulator of the species of optical reflection modulators with movable minor surfaces.

BRIEF DESCRIPTION OF THE DRAWINGS

The invention will be described in detail below by way of example in the specification read in conjunction with the drawings, in which:

FIG. 1(a) is a schematic view of a first embodiment of a modulator according to the present invention in a first state;

FIG. 1(b) is a schematic view of a first embodiment of a modulator according to the present invention in a second state;

DETAILED DESCRIPTION OF PREFERRED EMBODIMENTS

Figure 2A:
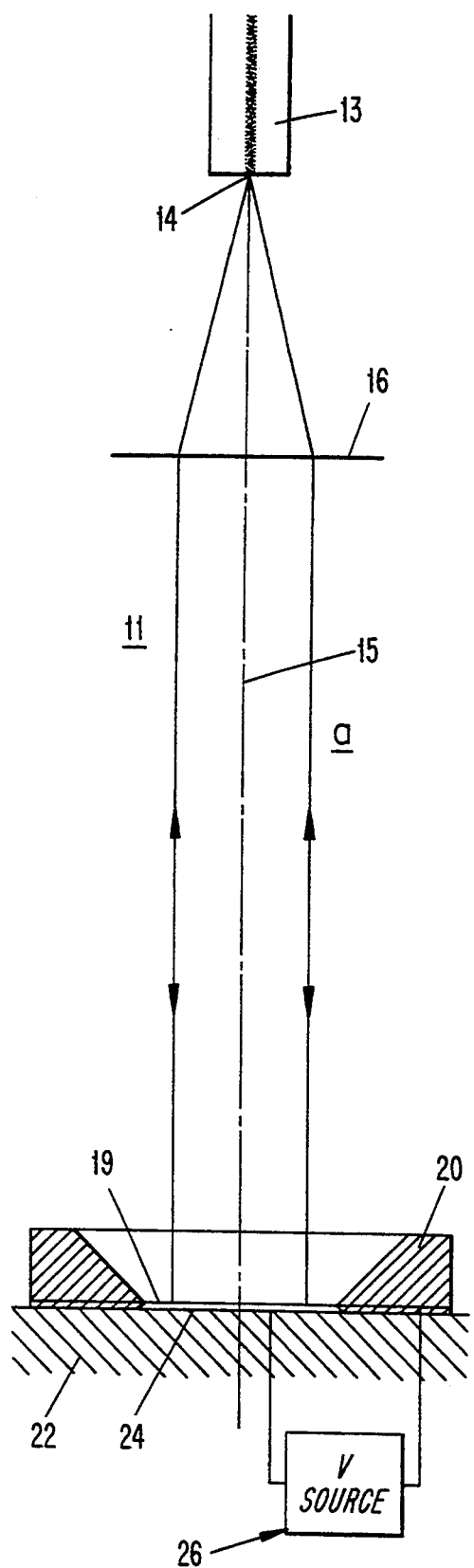
FIG. 2(a) is a schematic view of a second embodiment of a modulator according to the present invention in a first state.

FIGS. 1(a) and 1(b) are principal optical lateral views of a first preferred embodiment of a light modulator 11 in two different states, respectively. Light reaches the light modulator 11 via an optical fiber 13, which is, for example, a monomode glass fiber. At the end of the fiber 13, the light emerges at a light exit point 14, widens conically in a known manner and reaches a mirror 19. This mirror 19 is preferably a highly reflecting foil which, for example, is tightly stretched circularly in a holder 20. The reflecting property is preferably obtained by applying a metal layer using vacuum evaporation.

The mirror foil can be flat (FIG. 1(a)) or, looking in the direction of the light beam, concave (FIG. 1(b)). This corresponds to two basically different states of the mirror 19.

If the surface of the mirror 19 is flat (FIG. 1(a)), the reflected light diverges and only a minimal part of this light returns to the light exit point 14. Thus, the back-directed flow of light into the optical fiber 13 is very small.

However, if the surface of the mirror 19 is concavely curved (FIG. 1(b)), i.e. if it has the approximate shape of a spherical section, the spherical center of which coincides with the light exit point 14 of the optical fiber 13, each partial beam is exactly reflected back onto itself. Thus, a large portion of the reflected light returns to the point 14 and thus can again enter the optical fiber 13. The back-directed flow of light in the fiber 13 is therefore large.

A modulation or intensity change of the reflected light beam is thus made possible by the described change of the different states of the mirror 19. For this purpose the modulator 11 has a substrate 22, the surface of which, embodied as an electrode 24, is disposed parallel close to, but not touching, the mirror foil. Together, the metallic mirror layer and the electrode 24 form a plate-shaped capacitor. This capacitor can be electrically charged in various ways. These are represented in the figure by a voltage source 26 connected across the electrode 24 and the holder 20, which in this example is conductive and in electrical contact with the metal foil. In the course of charging, electrostatic forces appear between the substrate 22 and the mirror 19. These forces cause a spherical arching of the mirror foil. This means that instead of its flat shape, the mirror takes on the form of a spherical section. The resulting concave shape is achieved when the mirror 19 and the electrode 24 are connected to different potentials, i.e. if there is an electrical potential between them which pulls the mirror 19 toward the substrate 22.

Figure 2B:
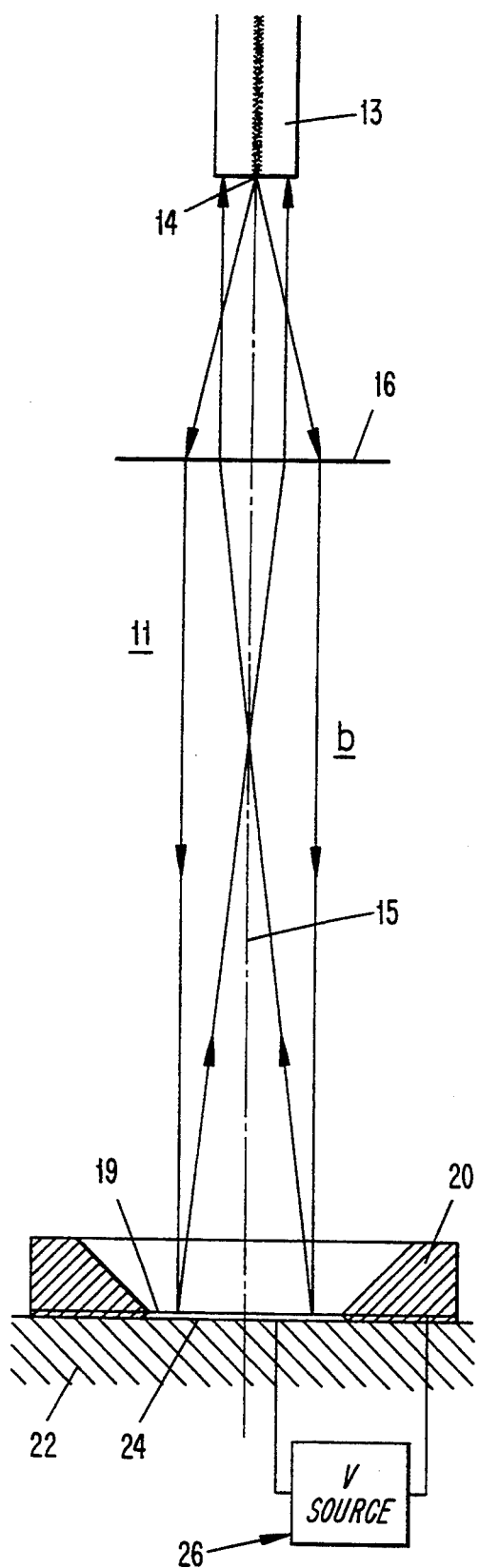
FIG. 2(b) is a schematic view of a second embodiment of a modulator according to the present invention in a second state.

FIGS. 2(a) and 2(b) show a second embodiment of a modulator 11 according to the present invention. In contrast to the first embodiment of the modulator 11 in accordance with FIGS. 1(a) and 1(b), the modulator 11 of FIGS. 2(a) and 2(b) has a focusing lens 16. This is disposed between the optical fiber 13 and the mirror 19 in such a way that it is located symmetrically in respect to the optical axis 15 and one of its foci coincides with the light exit point 14 of the fiber 13. The lens 16 collimates the light beam which divergently exits the fiber 13. This parallel light beam strikes the mirror 19 orthogonally.

If this mirror 19 has a flat mirror surface in accordance with FIG. 2(a), the striking light beam is completely reflected back onto itself by the reflection. Thus it enters the optical fiber 13 again in the reverse direction essentially without attenuation. However, if the mirror 19 has a concavely arched surface, looking in the beam direction, the reflected light beam converges. The amount of light which reaches the optical fiber 13 will be determined by the relative dimensions and spacings of the elements in the system and by the laws of geometrical optics. However, in any case only a small fraction of the emerging light again enters the optical fiber 13.

The modulator 11 in accordance with the invention is basically distinguished in that it has a flexible mirror 19 which in itself can be deformed. This mirror can be brought into at least two different states. In one of these states, the light emerging from the optical fiber 13 is reflected almost completely back into this fiber in accordance with the laws of geometrical optics. In the other state, however, the light is predominantly distributed in such a way that only a small portion of this light gets back into the optical fiber 13.

Thus, the modulator 11 functions simply in accordance with the laws of geometrical optics. By means of this it is possible without any problem to recite other variants, in that it is determined in pairs, which mirror shapes, flat, slightly concave, highly concave, convex, etc., are assigned to which states. None of the optical distances or measurements is particularly critical.

It is advantageous to produce the mirror foil as an etched diaphragm. Such diaphragms can be produced relatively without problems by directed etching of doped semiconductors, for example silicon mono-crystalline disks with suitable pn-doped layers. By vacuum-evaporation of metallic layers it is then possible to cream the mirror properties as well as the electrode for applying the electrostatic voltages which cause the deflection of the mirror 19. In this way it is possible in a cost-effective manner to produce very small and compact modulators 11, which operate dependably up into the MHz range. Triggering of such modulators 11 requires only relatively low voltages and almost no current. However, it is also possible to provide an integrated coil with the foil through which a control current can flow.

Furthermore, piezoelectric material can be used as the base for a controlled deflection of the mirror 19.

The modulators 11 described up to now are based on a reflection of the light emerging from the optical fiber 13 back into this fiber. Therefore they are reflecting modulators. However, it is easily possible to cause the reflection back into a second optical fiber through a small change of the optical conditions. In this case it is possible to modulate a light beam continuing from one to another optical fiber, or to switch it digitally to "light/dark".

What is claimed is:

1. A modulator for modulating the intensity of a light beam leaving an optical fiber along an optical axis, said modulator comprising:
a mirror means arranged on said optical axis for selectably directing said light beam, said mirror means including a flexible mirror which can be brought into at least a first state in which said light beam is mainly reflected in a direction back toward and into said optical fiber, and a second state, different from said first state, in which said light beam mainly is not reflected in a direction back toward and into said optical fiber.

2. A modulator in accordance with claim 1, wherein said mirror is flat in one of said first and second states and spherically arched in the other of said first and second states.

3. A modulator in accordance with claim 2, wherein said mirror in said other of said first and second states is concavely arched in the shape of a spherical section and is disposed in such a way that the center of the sphere corresponding to said spherical section coincides with a point at which said light beam exits said optical fiber.

4. A modulator in accordance with claim 2, further comprising a focusing lens between said optical fiber and said mirror, one of the foci of said focusing lens coinciding with a point at which said light beam exits said optical fiber, and wherein said mirror is arched concavely in said second state.

5. A modulator in accordance with claim 1 wherein said mirror comprises a layered metal diaphragm, and wherein said modulator further comprises:
a substrate associated with said diaphragm, and
means, in electrical contact with said diaphragm and said substrate, for applying an electrical control voltage between said diaphragm and said substrate.

6. A modulator in accordance with claim 1, wherein said mirror is disposed on a piezoelectric material.

7. A modulator for modulating the intensity of a light beam passing through an optical fiber, said modulator comprising:
a light exit and input point at an open end of said optical fiber;
a supported, flexible diaphragm with a metallic coating for reflecting the light beam leaving said optical fiber, and
an electrical control for influencing the geometrical shape of said diaphragm,
wherein in one geometrical shape the diaphragm forms a mirror plane intersected by said light beam essentially orthogonally and at a middle portion of said mirror plane, and in another geometrical shape forms a spherical mirror with a focal point influenceable by said control to essentially coincide with said light exit and input point.

8. A modulator in accordance with claim 7, wherein additionally a focusing lens is provided, said lens being disposed between said light exit and input point and said diaphragm in such a way that the focal point of said lens essentially coincides with said light exit and input point.

9. A modulator in accordance with claim 7, wherein said electrical control is a unit operating electrostatically with two electrodes.

10. A modulator in accordance with claim 7, wherein said electrical control is an unit operating electrodynamically with a control coil mechanically coupled with said diaphragm.

11. A modulator in accordance with claim 7, wherein said electrical control is an unit built up with a piezoelectrical element mechanically coupled with said diaphragm.

12. A modulator in accordance with claim 7, wherein said diaphragm is an etched semiconductor element.

* * * * *